US010421380B2

(12) United States Patent
Keenan et al.

(10) Patent No.: US 10,421,380 B2
(45) Date of Patent: Sep. 24, 2019

(54) CONSOLE ASSEMBLY WITH STOWABLE TRANSMISSION SHIFTER AND SLIDING ARMREST

(71) Applicant: FORD GLOBAL TECHNOLOGIES, LLC, Dearborn, MI (US)

(72) Inventors: Jason Michael Keenan, Dearborn, MI (US); Ryan Mathew Sandor, North Wales, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 15/902,687

(22) Filed: Feb. 22, 2018

(65) Prior Publication Data

US 2018/0244181 A1  Aug. 30, 2018

Related U.S. Application Data

(60) Provisional application No. 62/463,390, filed on Feb. 24, 2017.

(51) Int. Cl.
| | | |
|---|---|---|
| *B60N 2/75* | (2018.01) | |
| *B60N 3/00* | (2006.01) | |
| *B60K 20/02* | (2006.01) | |
| *F16H 59/10* | (2006.01) | |
| *F16H 59/08* | (2006.01) | |

(Continued)

(52) U.S. Cl.
CPC ............. *B60N 2/773* (2018.02); *B60K 20/02* (2013.01); *B60N 2/767* (2018.02); *B60N 2/793* (2018.02); *B60N 2/797* (2018.02); *B60N 3/002* (2013.01); *F16H 59/08* (2013.01); *F16H 59/10* (2013.01); *F16H 59/105* (2013.01); *B60R 7/04* (2013.01); *F16H 59/0278* (2013.01); *F16H 2061/223* (2013.01)

(58) Field of Classification Search
CPC ........ B60N 2/797; B60N 2/777; B60N 2/793; B60N 2/773; B60N 3/002; F16H 59/08; F16H 59/10; F16H 59/105; F16H 59/12; F16H 59/0278; F16H 2059/081; B60R 7/04; B60K 20/02
USPC .................................. 296/37.8, 24.34, 1.09
See application file for complete search history.

(56) References Cited

U.S. PATENT DOCUMENTS

| | | | | |
|---|---|---|---|---|
| 5,617,929 A | * | 4/1997 | Richardson ............ | B60K 20/02 180/326 |
| 6,253,869 B1 | * | 7/2001 | Wilson ................... | B60K 20/02 180/326 |

(Continued)

FOREIGN PATENT DOCUMENTS

| | | |
|---|---|---|
| CN | 2625193 Y | 7/2004 |
| CN | 201769688 U | 3/2011 |

OTHER PUBLICATIONS

English Machine Translation of CN201769688U.
English Machine Translation of CN2625193Y.

*Primary Examiner* — Gregory A Blankenship
(74) *Attorney, Agent, or Firm* — Vichit Chea; King & Schickli, PLLC

(57) ABSTRACT

A console assembly includes a base, a transmission shifter, a guideway and an armrest. The transmission shifter is carried on the base and is displaceable between a plurality of transmission mode defining positions and a storage position. The armrest is carried on the base by a guideway and is displaceable by sliding motion between a home position and a deployed position.

19 Claims, 6 Drawing Sheets

(51) Int. Cl.
*B60R 7/04* (2006.01)
*F16H 59/02* (2006.01)
*F16H 61/22* (2006.01)

(56) References Cited

U.S. PATENT DOCUMENTS

| | | | | |
|---|---|---|---|---|
| 6,564,661 | B2* | 5/2003 | DeJonge | B60K 37/06 |
| | | | | 74/335 |
| 6,736,438 | B1* | 5/2004 | Wieclawski | B60N 3/002 |
| | | | | 296/24.3 |
| 2002/0139602 | A1* | 10/2002 | Okanda | B60K 20/02 |
| | | | | 180/326 |
| 2003/0155786 | A1* | 8/2003 | Kim | B60R 7/04 |
| | | | | 296/24.34 |
| 2007/0176448 | A1* | 8/2007 | Spykerman | B60K 20/02 |
| | | | | 296/24.34 |
| 2010/0090491 | A1* | 4/2010 | Hipshier | B60R 7/04 |
| | | | | 296/24.34 |
| 2010/0244478 | A1* | 9/2010 | DePue | B60N 3/101 |
| | | | | 296/24.43 |
| 2014/0284957 | A1* | 9/2014 | Duenas | B60N 3/101 |
| | | | | 296/37.9 |
| 2014/0346802 | A1* | 11/2014 | Horton | B60R 11/00 |
| | | | | 296/37.8 |
| 2015/0258923 | A1* | 9/2015 | Skapof | B60R 7/04 |
| | | | | 296/24.34 |
| 2016/0176290 | A1* | 6/2016 | Quijano | B60K 20/04 |
| | | | | 296/24.34 |
| 2016/0250978 | A1* | 9/2016 | Suzuki | B60R 7/04 |
| | | | | 296/37.8 |
| 2018/0244182 | A1* | 8/2018 | Keenan | B60N 2/773 |

* cited by examiner

CONSOLE ASSEMBLY WITH STOWABLE TRANSMISSION SHIFTER AND SLIDING ARMREST

This application claims the benefit of provisional patent application Ser. No. 62/463,390 filed on 24 Feb. 2017, the full disclosure of which is incorporated by reference.

TECHNICAL FIELD

This document relates generally to the motor vehicle equipment field and, more particularly, to a new and improved console assembly incorporating a stowable transmission shifter and a sliding armrest.

BACKGROUND

It is known in the art to provide a motor vehicle with a transmission shifter on the center console. Such a transmission shifter includes a base, a stalk or shaft and a handle that projects upwardly from the center console where it may be easily accessed and used to select one or more transmission modes, such as PARK, REVERSE, NEUTRAL and DRIVE.

While such a transmission shifter is easy to reach and access and therefore easy to use, it should be appreciated that it takes up a significant amount of space on the center console and in many ways limits how the center console may be equipped with other convenience features.

This document relates to a new and improved console assembly including a stowable transmission shifter that may be displaced into a storage position within a shifter receiver in the base of the console. Further, the console assembly includes a sliding armrest that may be displaced by sliding motion so as to overlie the transmission shifter stored in the shifter receiver and then folded over to provide for a convenient work surface. Accordingly, the new and improved console assembly described herein represents a significant advance in the motor vehicle arts.

SUMMARY

In accordance with the purposes and benefits described herein, a new and improved console assembly is provided. That console assembly comprises a base, a transmission shifter carried on the base, a guideway and an armrest carried on the base by the guideway. The transmission shifter is displaceable between a plurality of transmission mode defining positions and a storage position. The armrest is displaceable by sliding motion between a home position and a deployed position.

The base may include a storage compartment. The armrest may overlie and conceal the storage compartment within the home position. In contrast, the armrest may overlie the transmission shifter when the transmission shifter is in the storage position and the armrest is in the deployed position.

More particularly, the armrest may include a first body section. A first folding panel may be pivotally mounted by a first hinge to the first body section. The first folding panel may have a first armrest cushion on a first side and a first work surface on a second side opposite the first side. The first body section may include a second work surface.

The first armrest cushion may be exposed and the first work surface may face the second work surface when the first folding panel is in a first position. The first work surface and the second work surface are both exposed when the first panel is in a second position whereby the first work surface and the second work surface are aligned and form a first work area.

Still further, the armrest may include a second body section and a second folding panel pivotally mounted by a second hinge to the second body section. The second folding panel may have a second armrest cushion on a first face and a third work surface on a second face opposite the first face. Further, the second body section may include a fourth work surface.

The second armrest cushion may be exposed and the third work surface may face the fourth work surface when the second folding panel is in a third position. In addition, the third work surface and the fourth work surface may both be exposed when in a fourth position whereby the third work surface and the fourth work surface are aligned and form a second work area.

Still further, the base may include a shifter receiver. The transmission shifter may rest within the shifter receiver when in the storage position. That shifter receiver may be recessed with respect to an upper surface of the base and the transmission receiver may be held completely below the upper surface when in the storage position.

Still further, the base may include a cup holder in the upper surface of the base adjacent the shifter receiver. The first body section may overlie the shifter receiver when in the deployed position while the second body section may overlie the cup holder when in the deployed position.

Still further, the storage compartment may include a first bin and a second bin. The first body section may overlie and conceal the first bin when in the home position. The second body section may overlie and conceal the second bin when in the home position.

Still further, the console assembly may further include a first pull strap carried on the first body section and a second pull strap carried on the second body section. These pull straps may be utilized to displace the first and second body sections between the home and deployed positions.

In the following description, there are shown and described several preferred embodiments of the console assembly. As it should be realized, the console assembly is capable of other, different embodiments and their several details are capable of modification in various, obvious aspects all without departing from the console assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the console assembly and together with the description serve to explain certain principles thereof.

Reference will now be made in detail to the present preferred embodiments of the console assembly, examples of which are illustrated in the accompanying drawing figures.

DETAILED DESCRIPTION

Figure 1:
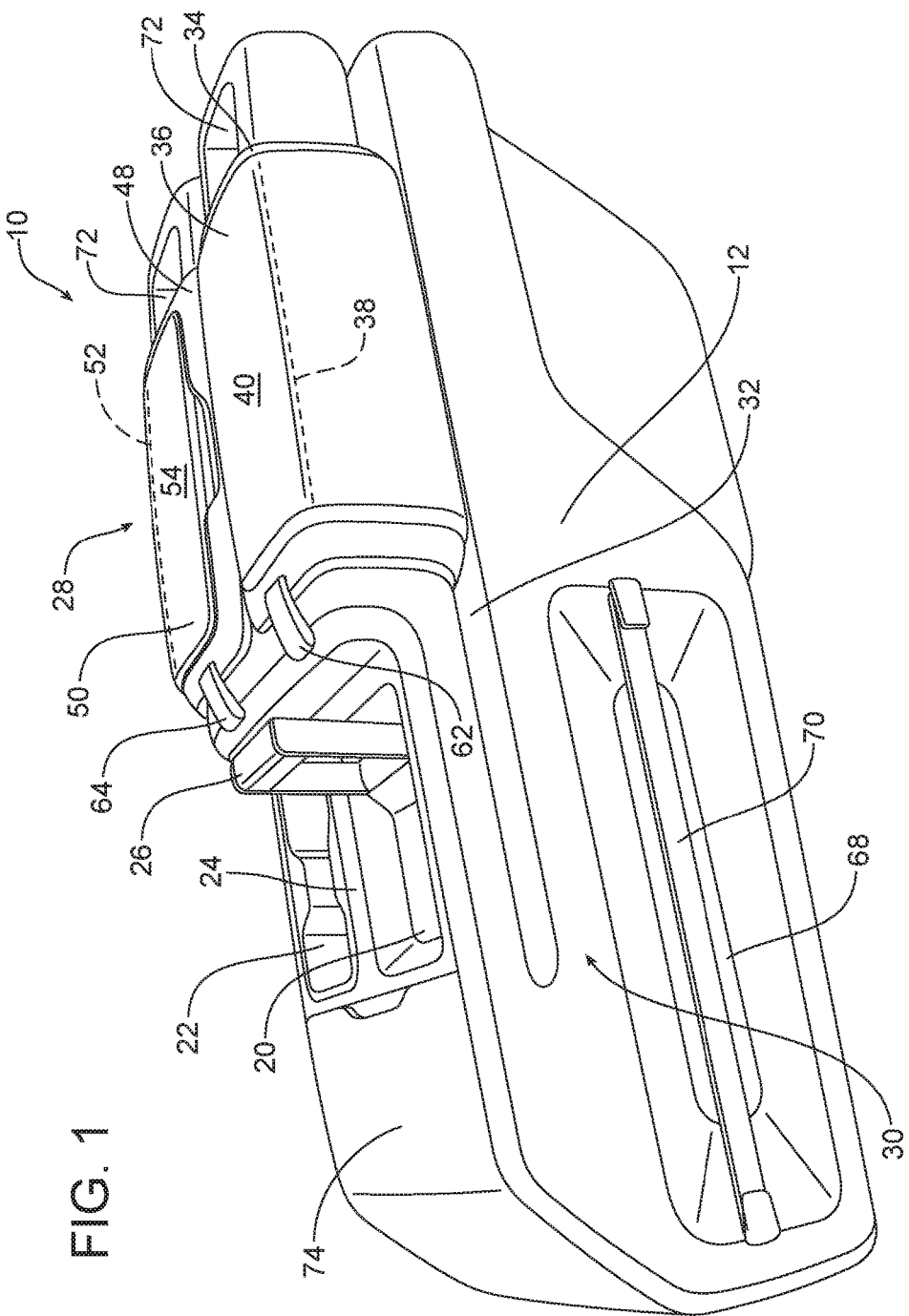
FIG. 1 is a detailed perspective view of the console assembly showing the transmission shifter in a relatively upright, use position and the two sections of the displaceable armrest in the home position.

Reference is now made to FIGS. 1-6 illustrating the new and improved console assembly 10. That console assembly includes a base 12. The base 12 includes a storage compartment 14. In the illustrated embodiment, the storage compartment 14 includes a first bin 16 and a second bin 18 (see FIG. 6). A shifter receiver 20 and a cup holder 22 are provided side-by-side in the upper surface 24 of the base as best illustrated in FIG. 1.

The console assembly 10 also includes a transmission shifter 26 carried on the base 12. The transmission shifter 26 is displaceable between a relatively upright, use position (illustrated in FIG. 1) wherein the transmission shifter is displaceable between a plurality of transmission mode defining positions such as, for example, PARK, REVERSE, NEUTRAL and DRIVE and a storage position (illustrated in FIG. 2) wherein the transmission shifter rests or nests in the shifter receiver 20 below the upper surface 24 of the base 12.

A displaceable armrest, generally designated by reference numeral 28 is carried on the base 12. More specifically, the base 12 includes a guideway 30 including a first guide track 32 on a first side of the base and a second guide track (not shown) on the opposite side of the base. The first guide track 32 and the second guide track are mirror images of each other. As will become apparent from the following description, the armrest 28, carried on the base 12 by the guideway 30, is displaceable by sliding motion between a home position illustrated in FIG. 1 and a deployed position illustrated in FIG. 6.

More specifically, the armrest 28 includes a first body section 34 that engages with and slides along the first guide track 32 of the guideway 30. A first folding panel 36 is pivotally mounted by a first hinge 38 to the first body section 34.

The first folding panel 36 includes a first armrest cushion 40 on a first side and a first work surface 42 on a second side opposite the first side. The first body section 34 also includes a second work surface 44 similar to the first work surface 42.

Figure 2:
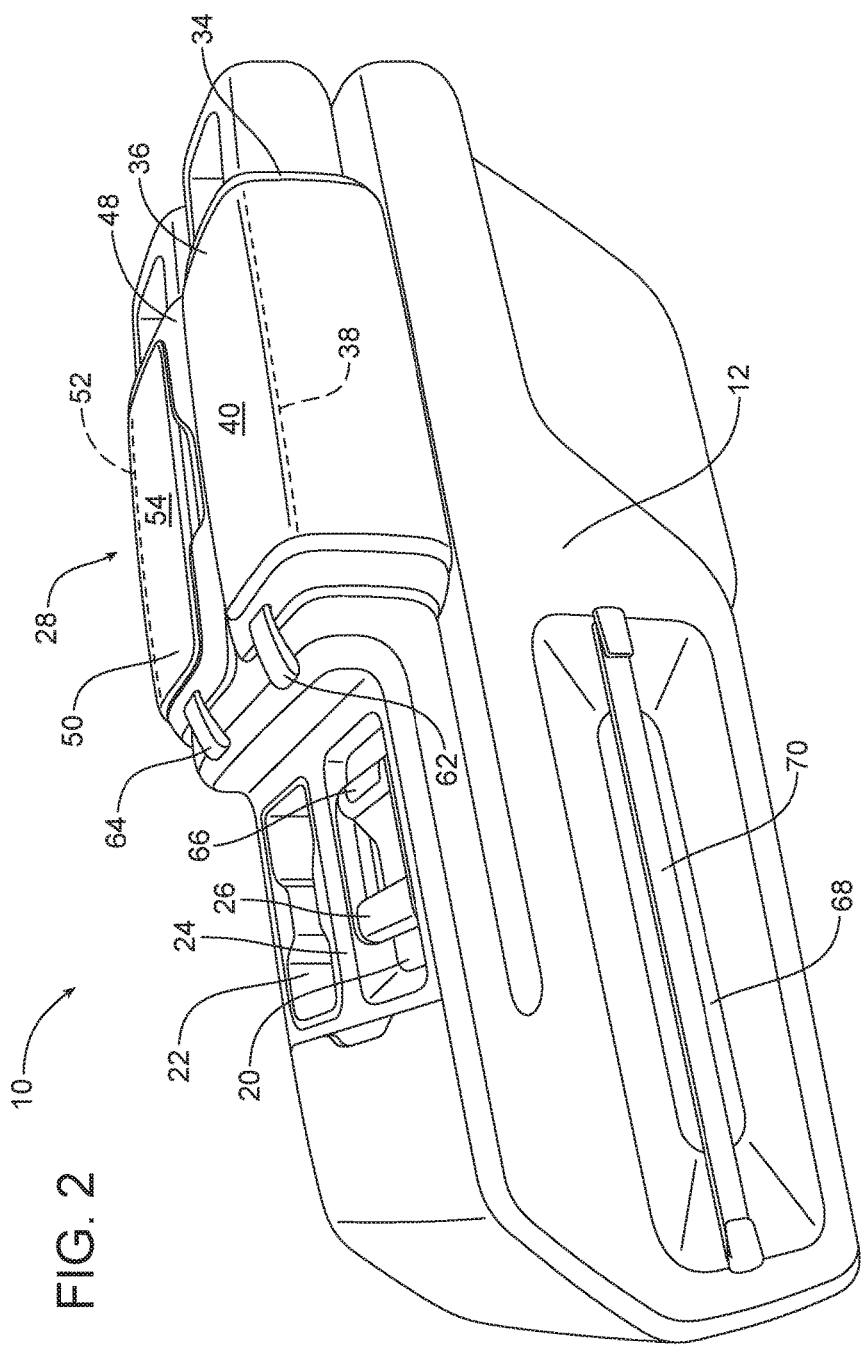
FIG. 2 is a view similar to FIG. 1 but for the transmission shifter being illustrated in the storage position nested within the shifter receiver in the base of the console assembly.
Figure 3:
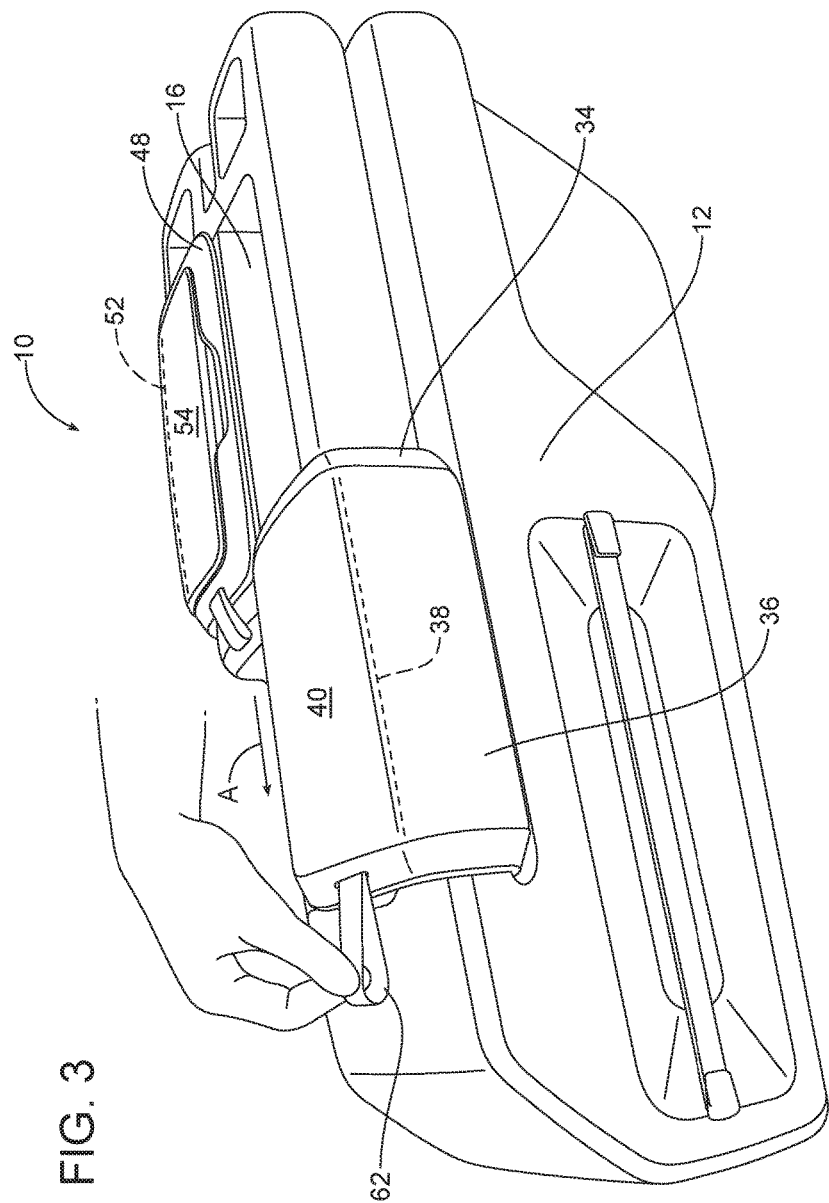
FIG. 3 is a view similar to FIG. 2 but showing the first body section of the armrest displaced forward into the deployed position overlying the transmission shifter nested in the shifter receiver.

When the first folding panel 36 is in a first position illustrated in FIGS. 1-3, the first work surface 42 is facing the second work surface 44 and the first armrest cushion 40 is exposed. In contrast, when the first folding panel 36 is in a second position, the first work surface 42 and the second work surface 44 are both exposed (see FIGS. 4-6). Together, the first work surface 42 and the second work surface 44 provide or form a first work area 46 in the form of an expansive smooth, flat surface.

As illustrated in FIGS. 1-6, the armrest 28 also includes a second body section 48. A second folding panel 50 is pivotally mounted to the second body section 48 by a second hinge 52. The second folding panel 50 has a second armrest cushion 54 on a first face and a third work surface 56 on a second face opposite the first face. The second body section 48 is displaceable along the second guide track of the guideway 30. Further, the second body section 48 includes a fourth work surface 58.

The second armrest cushion 54 is exposed and the third work surface 56 faces the fourth work surface 58 when the second folding panel is in a third position illustrated in FIGS. 1-5. In contrast, the third work surface 56 and the fourth work surface 58 are both exposed when the second folding panel 50 is in a fourth position illustrated in FIG. 6. As should be appreciated, in this fourth position, the third work surface 56 and the fourth work surface 58 cooperate and are aligned to form a second, expansive, smooth and flat work area 60. A first pull strap 62 may be carried on the first body section 34 while a second pull strap 64 may be carried on the second body section 48. Those pull straps 62, 64 may be utilized to displace the respective first and second body sections 34, 48 of the armrest 28 between the home position and the deployed position if desired.

FIG. 1 illustrates the transmission shifter 26 in a use position wherein the motor vehicle operator selects any one of a plurality of transmission mode defining positions including, for example, PARK, REVERSE, NEUTRAL and DRIVE. FIG. 1 also shows the first body section 34 and second body section body section 48 of the armrest 28 in the home position. In this position, the first body section 34 overlies and conceals the first bin 16 of the storage compartment 14 while the second body section 48 overlies and conceals the second bin 18 of the storage compartment. Both the first and second folding panels 36, 50 are in the first position so that the first armrest cushion 40 and the second armrest cushion 52 are exposed to support and cushion an elbow or forearm of the motor vehicle operator and/or a front passenger seat occupant.

When one parks the vehicle the transmission shifter 26 may be displaced from the transmission mode parked position to the storage position wherein the transmission shifter is received and nested within the shifter receiver 20 in the upper surface 24 of the base 12 (see FIG. 2). In the illustrated embodiment, this is accomplished by pivoting the transmission shifter forward into the shifter receiver 20.

As illustrated in FIG. 3, one may then engage the first pull strap 62 to slide the first body section 34 of the armrest 28 forward in the direction of action arrow A until the first body section 34 overlies the transmission shifter 26 nested within the shifter receiver 20. While hidden from view, it should be appreciated that when the armrest 28 is in the configuration shown in FIG. 3, the cup holder 22 in the upper surface 24 of the base 12 remains exposed and may hold a tall cup or any other item if desired.

Figure 4:
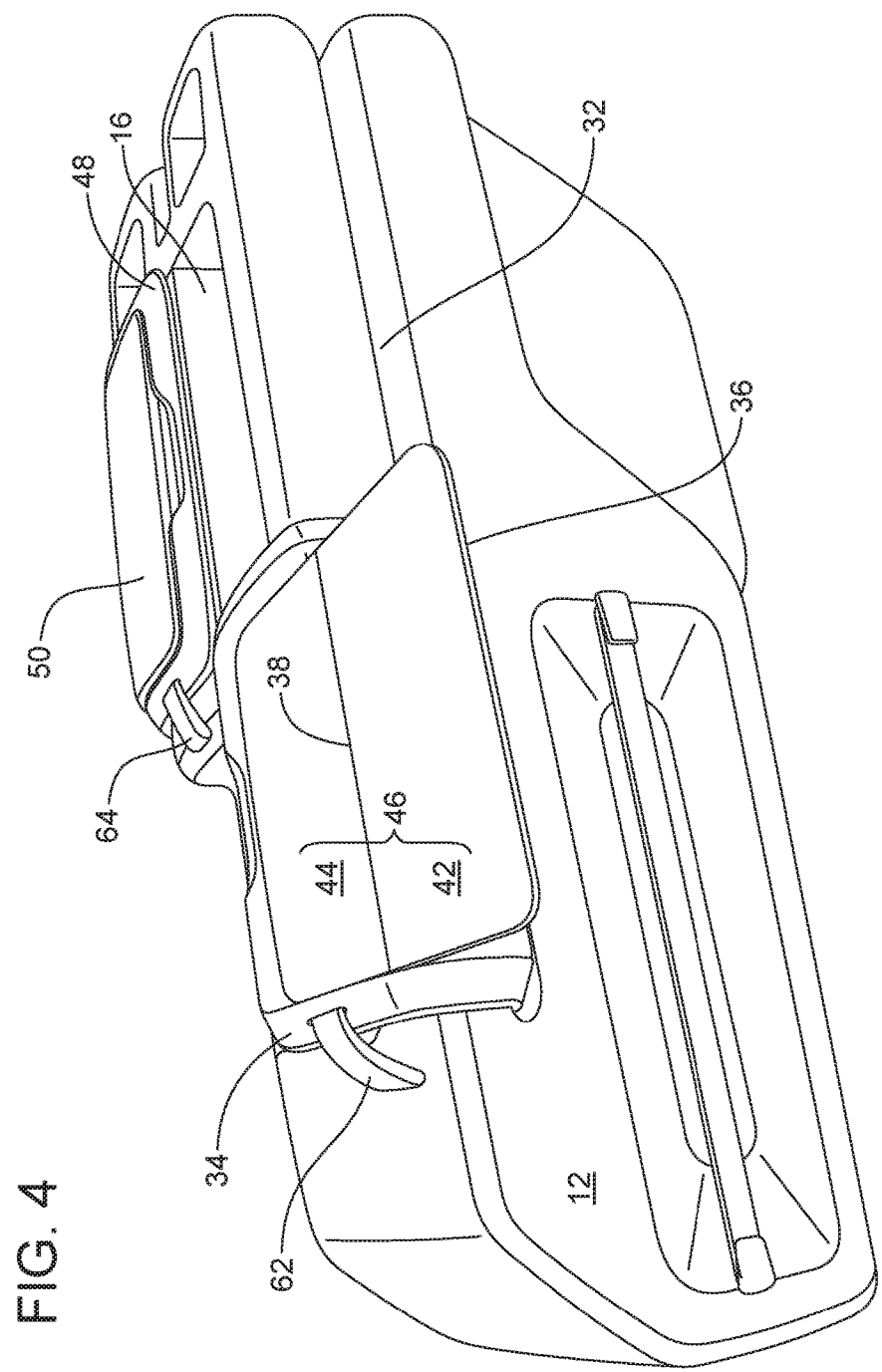
FIG. 4 is a view similar to FIG. 3 but showing the first folding panel opened into the second position so as to provide a first work area.

If one desires to use the first work area 46, one now pivots the first folding panel 36 about the hinge 38 from the first position illustrated in FIG. 3 to the second position illustrated in FIG. 4. The first work area 46 is formed by the cooperating first work surface 42 and second work surface 44. As should be appreciated from reviewing FIGS. 3 and 4, when the first body section 34 is in the deployed position, the first bin 16 of the storage compartment 14 is exposed so as to allow access as desired. This is true whether or not the first folding panel 36 is in the first position illustrated in FIG. 3 or the second position illustrated in FIG. 4.

Figure 5:
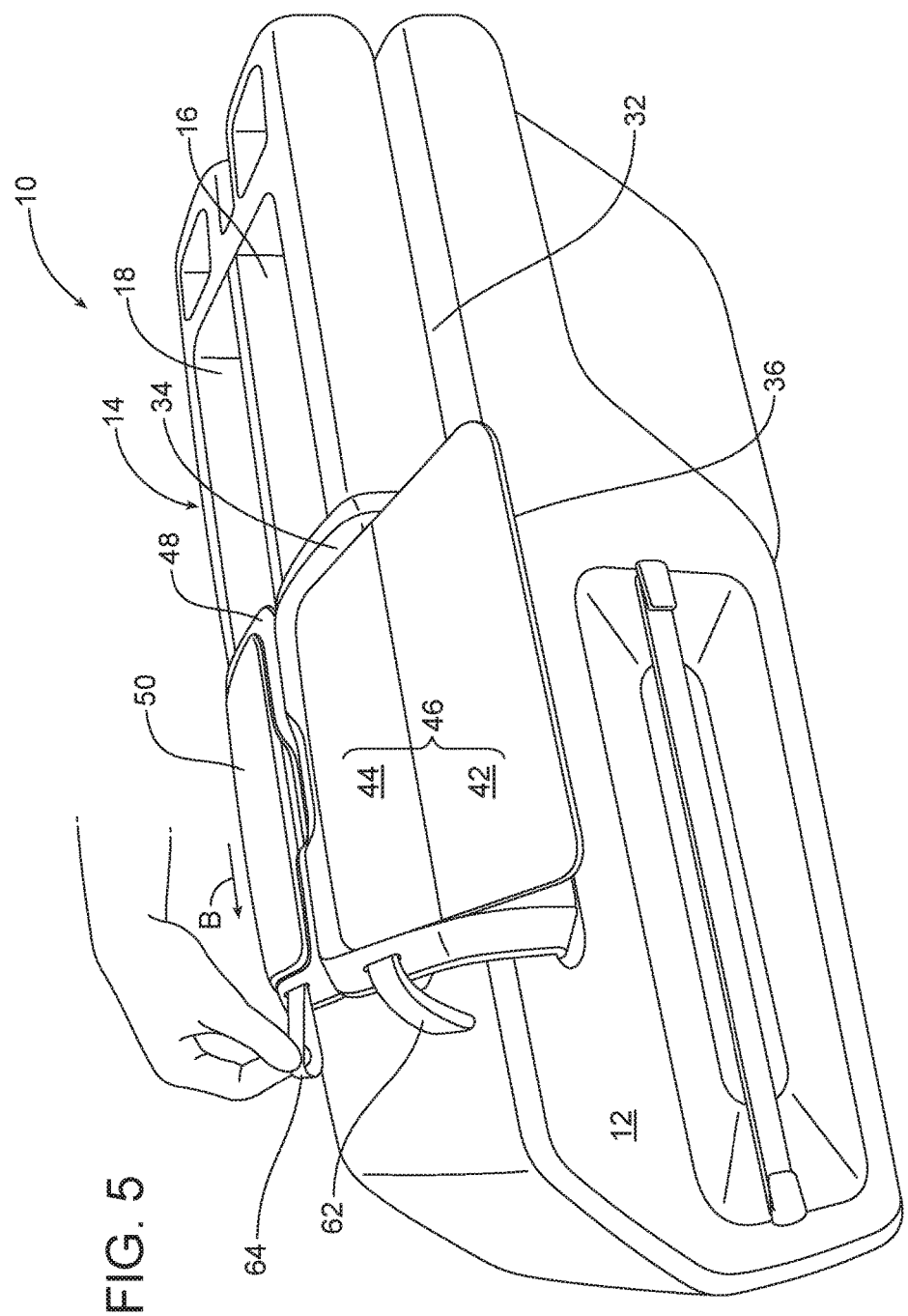
FIG. 5 is a view similar to FIG. 4 but showing the second body section of the armrest displaced forward into the deployed position overlying the cup holder in the base of the console assembly.

As illustrated in FIG. 5, the operator may engage the second full pull strap 64 to slide the second body section 48 of the armrest 28 from the home position illustrated in FIG. 4 to the deployed position illustrated in FIG. 5 (note action arrow B). When the second body section 48 is in the deployed position, the second body section covers the cup holder 22 in the upper surface 24 of the base 12. At the same time the second bin 18 of the storage compartment 14 is uncovered so as to allow access to any item held in that second bin or allow the user to place an object or item into the second bin.

Figure 6:
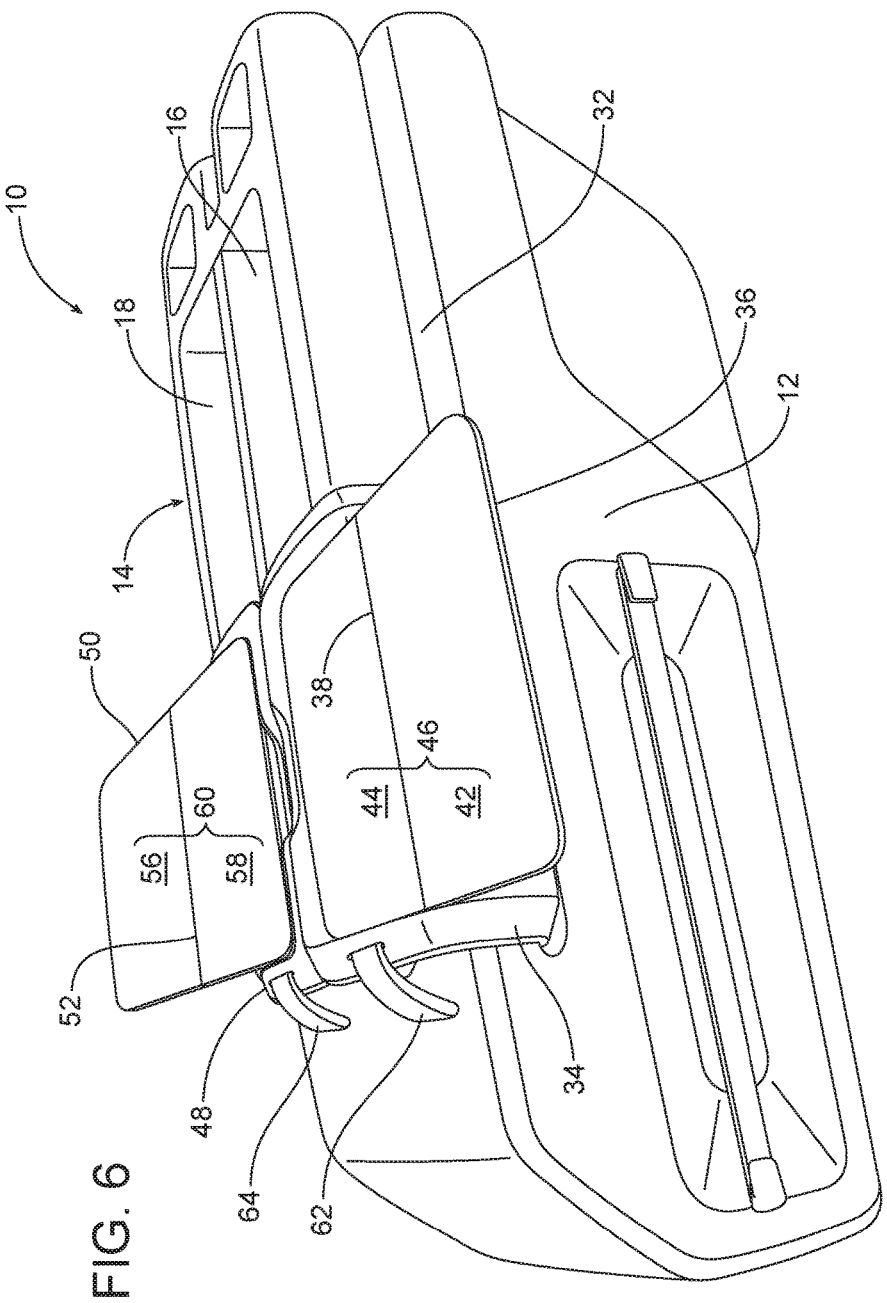
FIG. 6 is a view similar to FIG. 5 but showing the second folding panel pivoted open into the second position so as to form a second work area.

As illustrated in FIG. 6, the second folding panel 50 may then be displaced from the first position illustrated in FIG. 5 to the second position illustrated in FIG. 6 by pivoting that folding panel about the second hinge 52. When the second folding panel 50 is in the second position illustrated in FIG. 6, the third work surface 56 and the fourth work surface 58 combine to form the smooth, flat second work area 60.

In order to return the console assembly 10 from the configuration illustrated in FIG. 6 to the configuration illustrated in FIG. 1, one must pivot the first folding panel 36 about the first hinge 38 from the second position illustrated in FIG. 6 to the first position illustrated in FIGS. 1-3. Similarly, the second folding panel 50 is pivoted about the second hinge 52 from the second position illustrated in FIG. 6 to the first position illustrated in FIG. 5.

Next, one may slide the second body section 48 from the deployed position illustrated in FIG. 5 to the home position illustrated in FIG. 4. Similarly, the user may slide the first body section 34 from the deployed position illustrated in FIG. 3 to the home position illustrated in FIG. 1.

It should be appreciated that the displacement of the first body section 34 between the home and deployed positions and the second body section 48 between the home and deployed positions is completely independent from one another. Similarly, the displacement of the first folding panel 36 and the second folding panel 50 are completely independent from one another. Thus, it should be appreciated that the console assembly affords the user with a wide range of different configurations including many that are not illustrated in the drawing figures.

When an operator again wishes to use the transmission shifter 26 to select a transmission mode, the operator may depress the release button 66 (see FIG. 2) to return the transmission shifter 26 to the transmission mode position defining park. Here it should be appreciated that all transmission mode defining positions may be selected with the transmission shifter 28 in the relatively upright use position by simply pivoting the transmission shifter into different angular orientations with each use transmission mode defining position being identified by an appropriate detent and a visual indicator in a manner known in the art.

The foregoing has been presented for purposes of illustration and description. It is not intended to be exhaustive or to limit the embodiments to the precise form disclosed. Obvious modifications and variations are possible in light of the above teachings. For example, the guideway 30 may be provided with integral detents to provide resistance to displacement of the first body section 34 and the second body section 48 out of the home and deployed positions. Similarly, a latching system of a type known in the art (not shown) may be provided to secure the first body section 34 over the top of the first bin 16 and the second body section 48 over the top of the second bin 18 in the home position. This provides a theft deterrent respecting any items held in the storage bins 16, 18 of the storage compartment 14.

As further illustrated in the drawing figures, the sidewall of the base 12 may also include a concavity 68 and an elastic strap 70 for securing items in the cavity. Additional storage pockets 72 may be provided in the base 12 rearward of the armrest 28 when in the home position. In addition, a further storage compartment may be provided in the base 12 forward of the shifter receiver 20 and cup holder 22 underneath the hinged cover 74.

All such modifications and variations are within the scope of the appended claims when interpreted in accordance with the breadth to which they are fairly, legally and equitably entitled.

What is claimed:

1. A console assembly, comprising:
   a base;
      a transmission shifter carried on said base, said transmission shifter being displaceable between a plurality of transmission mode defining positions and a storage position;
      a guideway; and
      an armrest carried on said base by said guideway, said armrest being displaceable by sliding motion between a home position and a deployed position wherein said armrest overlies said transmission shifter when said transmission shifter is in said storage position and said armrest is in said deployed position.

2. The console assembly of claim 1, wherein said base includes a storage compartment.

3. The console assembly of claim 2, wherein said armrest overlies and conceals said storage compartment when in said home position.

4. The console assembly of claim 3, wherein said armrest includes a first body section and a first folding panel pivotally mounted by a first hinge to said first body section.

5. The console assembly of claim 4, wherein said first folding panel has a first armrest cushion on a first side and a first work surface on a second side opposite said first side.

6. The console assembly of claim 5, wherein said first body section includes a second work surface.

7. The console assembly of claim 6, wherein (a) said first armrest cushion is exposed and (b) said first work surface is facing said second work surface when said first folding panel is in a first position.

8. The console assembly of claim 7, wherein said first work surface and said second work surface are both exposed when said first panel is in a second position, whereby said first work surface and said second work surface are aligned and form a first work area.

9. The console assembly of claim 8, wherein said armrest includes a second body section and a second folding panel pivotally mounted by a second hinge to said second body section.

10. The console assembly of claim 9, wherein said second folding panel has a second armrest cushion on a first face and a third work surface on a second face opposite said first face.

11. The console assembly of claim 10, wherein said second body section includes a fourth work surface.

12. The console assembly of claim 11, wherein (a) said second armrest cushion is exposed and (b) said third work surface is facing said fourth work surface when said second folding panel is in a third position.

13. The console assembly of claim 12, wherein said third work surface and said fourth work surface are both exposed when in a fourth position, whereby said third work surface and said fourth work surface are aligned and form a second work area.

14. The console assembly of claim 13, wherein said base includes a shifter receiver and said transmission rests within said shifter receiver when in said storage position.

15. The console assembly of claim 14, wherein said shifter receiver is recessed with respect to an upper surface of said base and said transmission receiver is held below said upper surface when in said storage position.

16. The console assembly of claim 15, wherein said base includes a cup holder in said upper surface of said base adjacent said shifter receiver.

17. The console assembly of claim 16, wherein said first body section overlies said shifter receiver, when in said deployed position and second body section overlies said cup holder when in said deployed position.

18. The console assembly of claim 17, wherein said compartment includes a first bin and a second bin, said first body section overlying and concealing said first bin when in said home position and said second body section overlying and concealing said second bin in said home position.

19. The console assembly of claim 18, further including a first pull strap carried on said first body section and a second pull strap carried on said second body section.

\* \* \* \* \*